3,746,716
2-BENZYLAMINO - 5 - (5-BROMO - 2 - METHOXY-PHENLY)-1,3,4-THIADIAZOLE AND CONGENERS
Robert C. Tweit, Wilmette, Ill., assignor to
G. D. Searle & Co., Chicago, Ill.
No Drawing. Filed Sept. 30, 1971, Ser. No. 185,435
Int. Cl. C07d 91/62
U.S. Cl. 260—306.8 D    5 Claims

ABSTRACT OF THE DISCLOSURE

Preparation of 2 - phenylalkylamino - 5 - (substituted phenyl)-1,3,4-thiadiazoles wherein the 5 - phenyl substituents are halogen and/or alkoxy, and the useful biological properties of these thiadiazoles including antihypertensive, antiulcerogenic, and antiprotozoal activity, are disclosed.

---

This invention relates to 2-benzylamino-5-(5-bromo-2-methoxyphenyl) - 1,3,4 - thiadiazole and congeners. More particularly, this invention relates to new, useful, and unobvious chemical compounds of the formula

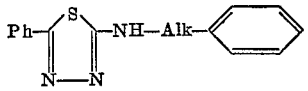

wherein Ph represents phenyl substituted by at least one halogen and/or alkoxy and Alk represents alkylene.

The halogens comprehended by the foregoing formula are commonly fluorine, chlorine, bromine, and iodine, among which bromine is often preferred. The alkoxys comprehended are advantageously of lower order, i.e., can be represented thus lower alkyl—O— the lower alkyl constituent being methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight- or branched-chain, hydrocarbon grouping of the formula —$C_nH_{2n+1}$ wherein n represents a positive integer less than 8. Those of the enformulated compounds wherein Ph represents phenyl substituted solely by one halogen and one alkoxy are especially desirable. These substituents can be variously positioned relative to the point of attachment of the 5-phenyl moiety, notwithstanding that embodiments of the invention having the alkoxy at carbon atom number 2 and the halogen at carbon atom number 5 of the aforesaid moiety are notably effective for the purposes set forth.

The alkylenes represented by Alk hereinabove are bivalent, saturated, acyclic, straight- or branched-chain, hydrocarbon groupings such as methylene, ethylene, trimethylene, propylene, tetramethylene, 1,1 - dimethylethylene, pentamethylene, 2,2-dimethyltrimethylene, or the like, characterized by the formula —$C_nH_{2n}$— wherein n has the meaning previously assigned. Among these groupings, methylene is preferred.

The compounds to which this invention relates are useful by reason of their valuable biological properties. They are, for example, potent antihypertensive agents. They also manifest antiulcerogenic and antiprotozoal activity.

The antihypertensive activity of the instant compounds can be demonstrated by a standardized test which matured from the observation by D. N. Green et al. in Am. J. Physiol., 170, 94 (1952) that chronic administration of desoxycorticosterone acetate (DCA) induces a self-sustaining hypertension that is similar in many respects to essential hypertension in man. The test animals are 50-gm. male, Charles River rats each implanted with a 20-mg. wax pellet containing 10 mg. of DCA and maintained thereafter on saline. After 5 weeks, their systolic blood pressures are measured electrosphygmographically via the tail arteries. On the following day, five of the rats are given 60 mg./kg. of test compound while a second group of 5 rats, receiving no compound, serves as controls. Four hours later, blood pressures are again measured via the tail arteries. A compound is considered active if it causes a reduction in blood pressure which is significant ($P<0.05$) when compared with control values.

The antiulcerogenic and antiprotozoal utilities of the instant compounds can be demonstrated by the tests for these properties described in U.S. 3,483,192.

Those skilled in the art will recognize that observations of activity in standardized tests for particular biological effect are fundamental to the development of valuable new drugs, both veterinary and human.

Preparation of the instant compounds proceeds by heating an aldehyde of the formula PhCHO with a thiosemicarbazide of the formula

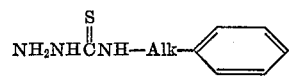

in 2-propanol containing a trace of acetic acid, whereupon the resultant thiosemicarbazone

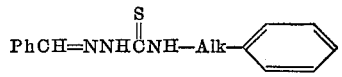

is heated with ferric chloride in aqueous dimethylformamide.

The following examples described in detail compounds illustratative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 5-bromo-2-methoxybenzaldehyde 4-benzyl-3-thiosemicarbazone.—A mixture of 32 parts of 5-bromo-2-methoxybenzaldehyde, 27 parts of 4-benzylthiosemicarbazide, 120 parts of 2-propanol, and approximately 1 part of acetic acid is heated at around 80° for 3 hours, whereupon 40 parts of methanol is introduced. The resultant mixture is chilled, and insoluble solids are thereupon separated by filtration. The material thus isolated is 5-bromo-2-methoxybenzaldehyde 4-benzyl - 3 - thiosemicarbazone melting at 179–181°.

(B) 2-benzylamino-5-(5-bromo - 2 - methoxyphenyl)-1,3,4-thiadiazole.—To a warm solution of approximately 27 parts of the product isolated by the procedure of the foregoing Part A in 250 parts of dimethylformamide is added a warm solution of 47 parts of ferric chloride hexahydrate in 100 parts of water. The resultant solution is heated at around 95° for three hours, then chilled. The insoluble solids thrown down are filtered off, dried in air, and recrystallized from chloroform to give 2 - benzylamino-5-(5-bromo - 2 - methoxyphenyl)-1,3,4- thiadiazole melting at 188–190.5°. The product has the formula

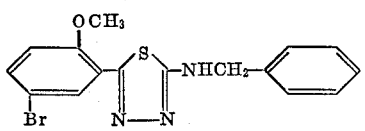

EXAMPLE 2

2 - benzylamino-5-(2-ethoxy-5-fluorophenyl)-1,3,4-thiadiazole.—Substitution of approximately 27 parts of 2-ethoxy-5-fluorobenzaldehyde for the 5-bromo-2-methoxybenzaldehyde called for in Example 1 affords, by the procedure there detailed, 2-benzylamino-5-(2-ethoxy-5-fluorophenyl)-1,3,4-thiadiazole.

EXAMPLE 3

2-benzylamino-5-(3-chloro - 4 - hexyloxyphenyl)-1,3,4-thiadiazole.—Substitution of 35 parts of 3-chloro-4-hexyloxybenzaldehyde for the 5-bromo - 2 - methoxybenzaldehyde called for in Example 1 affords, by the procedure there detailed, 2-benzylamino-5-(3-chloro - 4 - hexyloxyphenyl)-1,3,4-thiadiazole.

EXAMPLE 4

2 - benzylamino-5-(4-iodo-2-methoxyphenyl)-1,3,4-thiadiazole.—Substitution of approximately 37 parts of 4-iodo-2-methoxybenzaldehyde for the 5-bromo-2-methoxybenzaldehyde called for in Example 1 affords, by the procedure there detailed, 2-benzylamino - 5 - (4-iodo-2-methoxyphenyl)-1,3,4-thiadiazole.

EXAMPLE 5

2-benzylamino-5-(3-bromo - 4 - methoxyphenyl)-1,3,4-thiadiazole.—Substitution of 32 parts of 3-bromo-4-methoxybenzaldehyde for the 5-bromo-2-methoxybenzaldehyde called for in Example 1 affords, by the procedure there detailed, 2-benzylamino-5-(3-bromo - 4 - methoxyphenyl)-1,3,4-thiadiazole.

EXAMPLE 6

2-benzylamino-5-(3-bromo - 4 - hexyloxyphenyl)-1,3,4-thiadiazole.—Substitution of 40 parts of 3-bromo-4-hexyloxybenzaldehyde for the 5-bromo - 2 - methoxybenzaldehyde called for in Example 1 affords, by the procedure there detailed, 2-benzylamino-5-(3-bromo - 4 - hexyloxyphenyl)-1,3,4-thiadiazole.

EXAMPLE 7

2-benzylamino-5-(2-bromo - 3 - methoxyphenyl)-1,3,4-thiadiazole.—Substitution of 32 parts of 2-bromo-3-methoxybenzaldehyde for the 5-bromo-2-methoxybenzaldehyde called for in Example 1 affords, by the procedure there detailed, 2-benzylamino-5-(2-bromo-3-methoxyphenyl)-1,3,4-thiadiazole.

EXAMPLE 8

2-benzylamino-5-(2-bromo - 4 - methoxyphenyl)-1,3,4-thiadiazole.—Substitution of 32 parts of 2-bromo-4-methoxybenzaldehyde for the 5-bromo-2-methoxybenzaldehyde called for in Example 1 affords, by the procedure there detailed, 2-benzylamino-5-(2-bromo - 4 - methoxyphenyl)-1,3,4-thiadiazole.

EXAMPLE 9

2 - benzylamino-5-(2-bromo - 5 - ethoxyphenyl)-1,3,4-thiadiazole.—Substitution of approximately 34 parts of 2-bromo-5-ethoxybenzaldehyde for the 5-bromo-2-methoxybenzaldehyde called for in Example 1 affords, by the procedure there detailed, 2-benzylamino-5-(2-bromo-5-ethoxyphenyl)-1,3,4-thiadiazole.

EXAMPLE 10

2-benzylamino-5-(4-bromo - 2 - methoxyphenyl)-1,3,4-thiadiazole.—Substiution of 32 parts of 4-bromo-2-methoxybenzaldehydre for the 5-bromo-2-methoxybenzaldehyde called for in Example 1 affords, by the procedure there detailed, 2-benzylamino-5-(4-bromo - 2 - methoxyphenyl)-1,3,4-thiadiazole.

EXAMPLE 11

2-benzylamino-5-(4-bromo - 3 - methoxyphenyl)-1,3,4-thiadiazole.—Substitution of 32 parts of 4-bromo-3-methoxybenzaldehydre for the 5-bromo-2-methoxybenzaldehyde called for in Example 1 affords, by the procedure there detailed, 2-benzylamino-5-(4-bromo - 3 - methoxyphenyl)-1,3,4-thiadiazole.

What is claimed is:

1. A compound of the formula

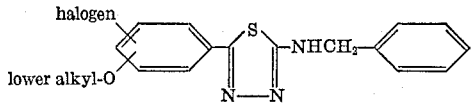

2. A compound according to claim 1 having the formula

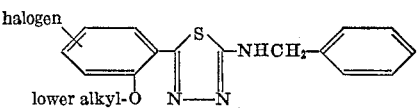

3. A compound according to claim 1 having the formula

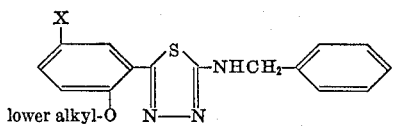

wherein X represents halogen of atomic number less than 53.

4. A compound according to claim 1 having the formula

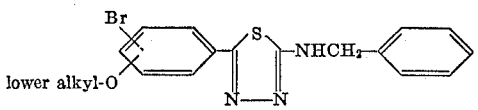

5. A compound according to claim 1 which is 2-benzylamino-5-(5-bromo-2-methoxyphenyl)-1,3,4-thiadiazole.

References Cited

Vakula et al., Chem. Abstracts, 71:49855 (1969).

RICHARD J. GALLAGHER, Primary Examiner

U.S. Cl. X.R.

260—552 SC; 424—270